US008529099B2

(12) United States Patent
Yang

(10) Patent No.: US 8,529,099 B2
(45) Date of Patent: Sep. 10, 2013

(54) HEAT DISSIPATING LAMP DEVICE HAVING ELECTRIC TURBINE AXIAL FAN

(76) Inventor: Tai-Her Yang, Dzan-Hwa (TW)

( * ) Notice: Subject to any disclaimer, the term of this patent is extended or adjusted under 35 U.S.C. 154(b) by 0 days.

(21) Appl. No.: 13/279,388

(22) Filed: Oct. 24, 2011

(65) Prior Publication Data

US 2013/0051026 A1 Feb. 28, 2013

Related U.S. Application Data

(63) Continuation-in-part of application No. 13/217,358, filed on Aug. 25, 2011, now abandoned, and a continuation-in-part of application No. 13/233,113, filed on Sep. 15, 2011, now abandoned.

(51) Int. Cl.

| | |
|---|---|
| ***F21V 9/00*** | (2006.01) |
| ***F21V 29/00*** | (2006.01) |
| ***B60Q 1/06*** | (2006.01) |

(52) U.S. Cl.
USPC .......................................... 362/294; 362/373

(58) Field of Classification Search
USPC .................................................. 362/294, 373
See application file for complete search history.

(56) References Cited

U.S. PATENT DOCUMENTS

| | | | | |
|---|---|---|---|---|
| 5,458,505 | A * | 10/1995 | Prager | 439/485 |
| 5,664,872 | A * | 9/1997 | Spearman et al. | 362/96 |
| 6,004,010 | A * | 12/1999 | Inage et al. | 362/294 |
| 6,511,209 | B1 * | 1/2003 | Chiang | 362/294 |
| 7,677,770 | B2 * | 3/2010 | Mazzochette | 362/364 |
| 7,911,119 | B2 * | 3/2011 | Sun | 313/46 |
| 8,057,071 | B2 * | 11/2011 | He et al. | 362/294 |
| 8,240,885 | B2 * | 8/2012 | Miller | 362/294 |
| 8,282,250 | B1 * | 10/2012 | Dassanayake et al. | 362/373 |
| 2011/0110095 | A1 * | 5/2011 | Li et al. | 362/294 |
| 2012/0033419 | A1 * | 2/2012 | Kim et al. | 362/235 |

* cited by examiner

*Primary Examiner* — David J Makiya
(74) *Attorney, Agent, or Firm* — Bacon & Thomas, PLLC

(57) ABSTRACT

The present invention provides an electric turbine axial fan, which is rainproof and installed at the top portion of sealed heat dissipation lamp housing of a high power lamp, so when the electric turbine axial fan is operated, the airflow passes through the top portion of lamp housing of the sealed heat dissipation lamp housing and is concentrated towards the center, then leaded to upwardly enter an axial airflow inlet port formed at the bottom of the electric turbine axial fan, thereby being exhausted to the surroundings through radially-arranged exhaust blades, thus a cooling effect by the external cooling airflow can be provided to the top portion of a high power lamp, which is relatively hotter; when external wind power drives the turbine axial fan, the loading of electric motor can be lowered so as to reduce the electric power outputted by the electric motor.

12 Claims, 7 Drawing Sheets

HEAT DISSIPATING LAMP DEVICE HAVING ELECTRIC TURBINE AXIAL FAN

CROSS-REFERENCE TO RELATED APPLICATION

This application is a Continuation-In-Part of application Ser. No. 13/233,113, filed on Sep. 15, 2011, now abandoned which is a Continuation-In-Part of application Ser. No. 13/217,358, filed on Aug. 25, 2011 now abandoned.

BACKGROUND OF THE INVENTION (a) Field of the Invention

A conventional turbine axial fan thermally actuated or driven by wind power is equipped with a sealed top portion having plural axial exhaust blades arranged at intervals and stacked with equal inclined angles annularly installed at its periphery, the center thereof is downwardly extended with an axial airflow inlet port; when in operation, the plural exhaust blades provide a turbine axial airflow exhausting function, and the axial airflow inlet port introduces airflow during the rotation operation then the introduced airflow is exhausted to the surroundings; at present, a high power lamp set often adopts a heat dissipation housing made of a heat conductive material having a sealed top portion for preventing rainwater from entering; the present invention provides a turbine axial fan driven by an electric motor and installed on the top portion of a heat dissipation lamp housing, so when the electric turbine axial fan is operated, the airflow is concentrated from the outside of top portion of lamp housing, which is relatively hotter, of the sealed heat dissipation lamp housing towards the center, and leaded to upwardly enter an axial airflow inlet port formed at the bottom of the electric turbine axial fan, thereby being exhausted to the surroundings through the radially-arranged exhaust blades, thus when the present invention being applied in a high power lamp, e.g. a high power LED lamp set, a cooling effect by external cooling airflow can be provided to the top portion, which is relatively hotter, of the LED lamp housing; when external wind power drives the turbine axial fan, the loading of electric motor can be lowered so as to reduce the electric power outputted by the electric motor.

(b) Description of the Prior Art

The cooling for a conventional LED lamp housing includes natural air cooling or fan cooling, wherein the rainproof effect for the fan cooling is relatively harder to establish, it is yet to be seen a lamp housing having its top portion installed with a rainproof electric turbine axial fan structure in the market place.

SUMMARY OF THE INVENTION

The present invention provides an electric turbine axial fan, which is rainproof and installed at the top portion of sealed heat dissipation lamp housing of a high power lamp, so when the electric turbine axial fan is operated, the airflow passes through the top portion of lamp housing, which is relatively hotter, of the sealed heat dissipation lamp housing and is concentrated towards the center, then leaded to upwardly enter an axial airflow inlet port formed at the bottom of the electric turbine axial fan, thereby being exhausted to the surroundings through radially-arranged exhaust blades, thus when the present invention being applied in a high power lamp, a cooling effect by the external cooling airflow can be provided to the top portion, which is relatively hotter; when external wind power drives the turbine axial fan, the loading of electric motor can be lowered so as to reduce the electric power outputted by the electric motor.

DESCRIPTION OF MAIN COMPONENT SYMBOLS

Figure 1:
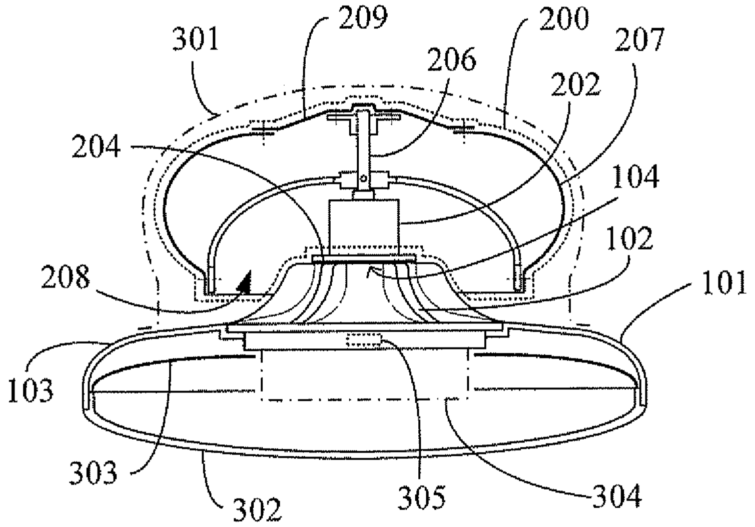
FIG. 1 is a schematic structural view showing the lamp structure, according to the present invention.

10: Support arm
20: Support rod
30: Partition structure
40: Suspension device
101: Lamp housing
1000: Top cover
1010: Recessed hole
102'1020: Heat dissipation structure
103: Annular arc-shape airflow guide surface
1030: Annular arc-shaped airflow guide hole
104: Top portion of heat dissipation structure
1040: Notch
1050: Columnar body
200: electric turbine axial fan
202: Electric motor
204: Heat insulation member
206: Rotation shaft
207: Radially-arranged exhaust blade

208: Axial fluid inlet port
209: Sealed top cover
301: Top portion covering net
302: Light-pervious lampshade
303: Secondary optical device
304: Electric driven light emitting lamp set
305: Temperature switch

DETAILED DESCRIPTION OF THE PREFERRED EMBODIMENTS

The cooling for a conventional LED lamp housing includes natural air cooling or fan cooling, wherein the rainproof effect for the fan cooling is relatively harder to establish, it is yet to be seen a lamp housing having its top portion installed with a rainproof electric turbine axial fan structure in the market place.

A conventional turbine axial fan thermally actuated or driven by wind power is equipped with a sealed top portion having plural axial exhaust blades arranged at intervals and stacked with equal inclined angles annularly installed at its periphery, the center thereof is downwardly extended with an axial airflow inlet port; when in operation, the plural exhaust blades provide a turbine axial airflow exhausting function, and the axial airflow inlet port introduces airflow during the rotation operation then the introduced airflow is exhausted to the surroundings; at present, a high power lamp set often adopts a heat dissipation housing made of a heat conductive material having a sealed top portion for preventing rainwater from entering; the present invention provides a turbine axial fan driven by an electric motor and installed on the top portion of a heat dissipation lamp housing, so when the electric turbine axial fan is operated, the airflow is concentrated from the outside of top portion of lamp housing, which is relatively hotter, of the sealed heat dissipation lamp housing towards the center, and leaded to upwardly enter an axial airflow inlet port formed at the bottom of the electric turbine axial fan, thereby being exhausted to the surroundings through the radially-arranged exhaust blades, thus when the present invention being applied in a high power lamp, e.g. a high power LED lamp set, a cooling effect by external cooling airflow can be provided to the top portion, which is relatively hotter, of the LED lamp housing; when external wind power drives the turbine axial fan, the loading of electric motor can be lowered so as to reduce the electric power outputted by the electric motor.

Figure 2:
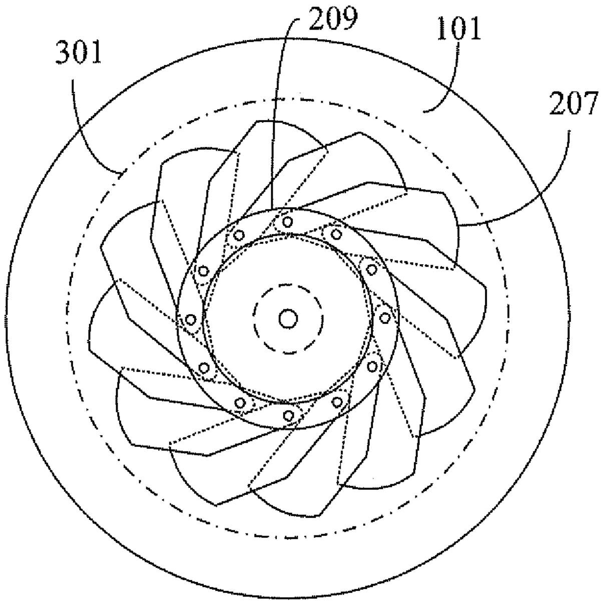
FIG. 2 is a top view of FIG. 1.
Figure 3:
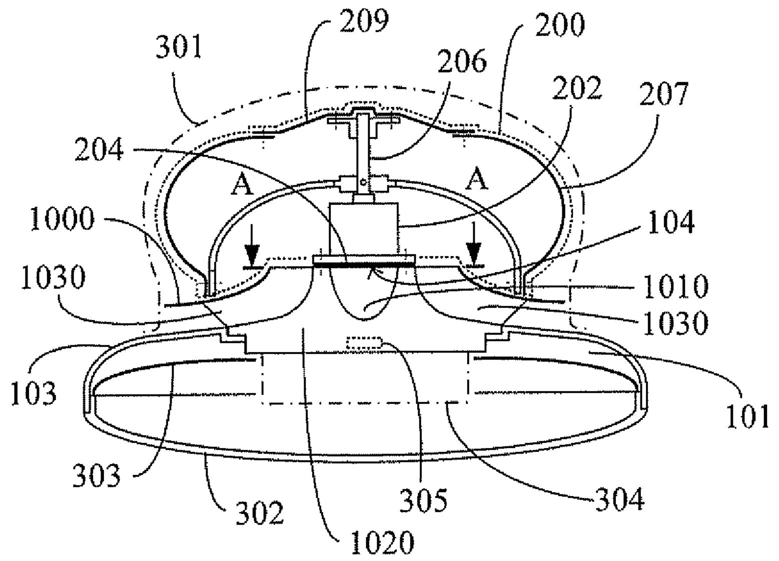
FIG. 3 is a schematic structural view showing a heat dissipation structure (1020) being installed, and an annular arc-shaped airflow guide hole (1030) being provided for guiding cold/hot airflow, according to the present invention.
Figure 4:
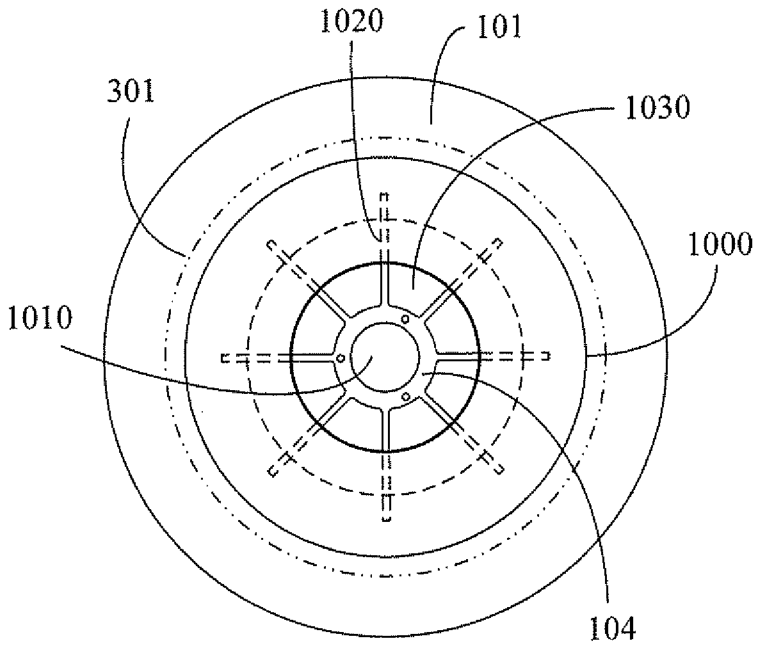
FIG. 4 is a cross sectional view of FIG. 3 taken along an A-A line.
Figure 5:
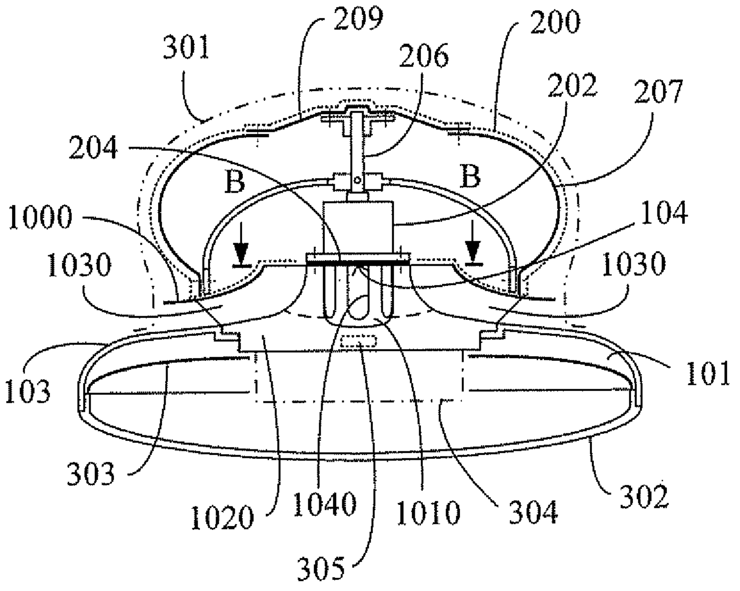
FIG. 5 is a schematic structural view showing a heat dissipation structure (1020) being installed, and a recessed hole (1010) having a notch (1040) at top center and an annular arc-shaped airflow guide hole (1030) being provided for guiding cold/hot airflow, according to the present invention.
Figure 6:
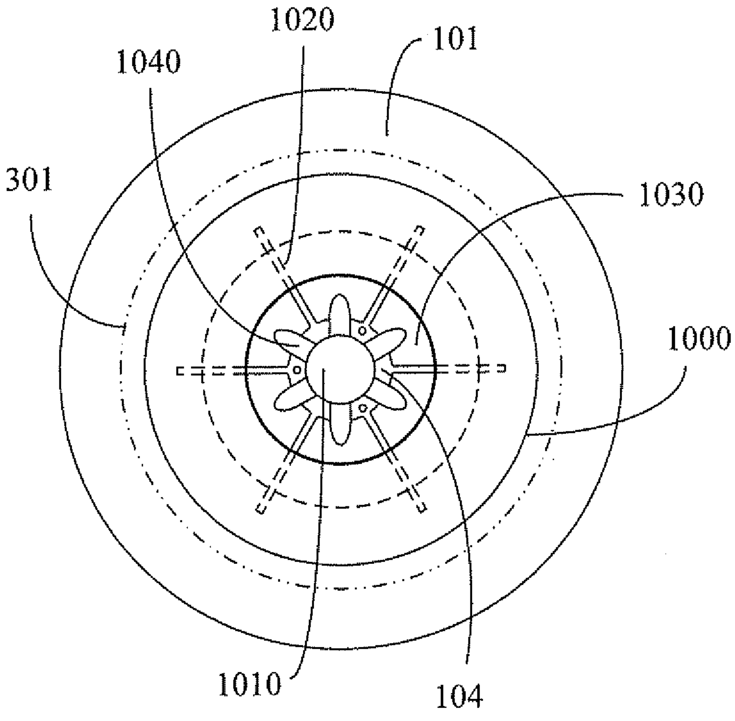
FIG. 6 is a cross sectional view of FIG. 5 taken along a B-B line.
Figure 7:
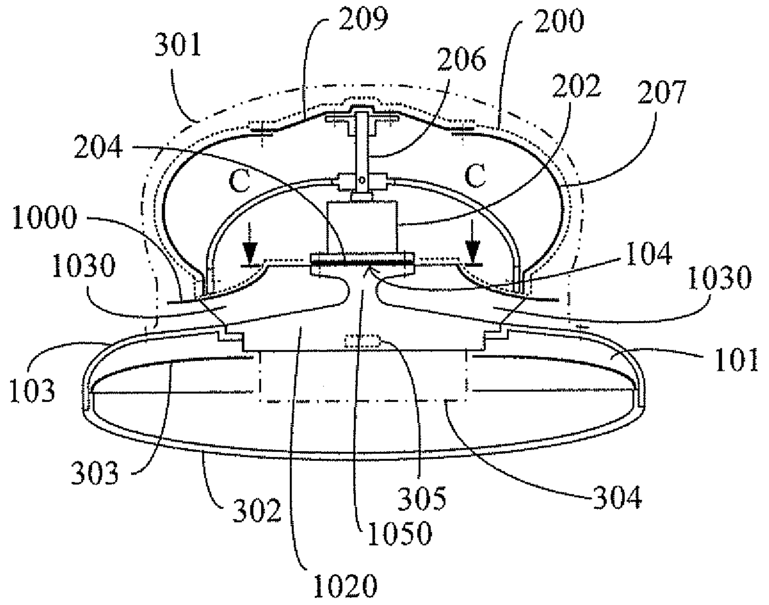
FIG. 7 is a schematic structural view showing the heat dissipation structure (1020) being installed, and the annular arc-shaped airflow guide hole (1030) and a columnar body (1050) having inward-recessed top center being provided for guiding cold/hot airflow.
Figure 8:
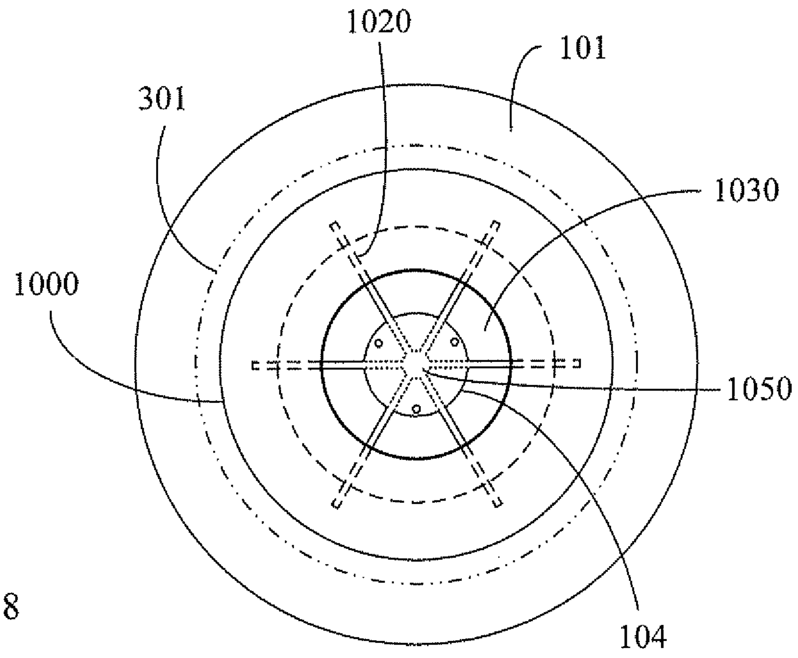
FIG. 8 is a cross sectional view of FIG. 7 taken along a C-C line.

FIG. 1 is a schematic structural view showing the lamp structure, according to the present invention, and FIG. 2 is a top view of FIG. 1, which mainly consists of:

Lamp housing (101), heat dissipation structure (102): the lamp housing (101) is constituted by a bowl-shaped structure reversely disposed, and configured by a heat conductive member or non-heat conductive member, the top center thereof and the heat dissipation structure (102) formed in round shape or conical shape and having vertical radial blades are integrally formed or assembled with each other, the bottom of the heat dissipation structure (102) allows a LED or other lamps to be installed, and the lamp housing (101) is formed with an annular arc-shape airflow guide surface (103) along the periphery of the heat dissipation structure (102);

Electric turbine axial fan (200): constituted by a turbine driven by a built-in electric motor (202) and having radially-arranged exhaust blades (207), the bottom of the static part of electric motor is installed on the top portion (104) of heat dissipation structure (102) and spaced by a heat insulation member (204), a rotation shaft (206) of the rotary part of electric motor is upwardly extended for serving as a core shaft for driving the turbine having the radially-arranged exhaust blades (207), the bottom of the electric turbine axial fan (200) is formed with an axial fluid inlet port (208) for introducing the fluid passing the annular arc-shaped airflow guide surface (103) of the lamp housing (101) to pass through the periphery of the top of heat dissipation structure (102), then be exhausted to the surroundings through the radially-arranged exhaust blades (207), and the top of electric turbine axial fan (200) is provided with a sealed top cover (209) for providing protection to the electric motor (202);

FIG. 3 is a schematic structural view showing the heat dissipation structure (1020) being installed, and the annular arc-shaped airflow guide hole (1030) being provided for guiding the cold/hot airflow, according to the present invention, and FIG. 4 is a cross sectional view of FIG. 3 taken along an A-A line, which mainly consists of:

Lamp housing (101), heat dissipation structure (1020); the lamp housing (101) is constituted by a bowl-shaped structure reversely disposed, and configured by a heat conductive member or non-heat conductive member, the heat dissipation structure (1020) is configured by a high-performance heat conductive member, the top center thereof is formed in round or conical shape or other geometric shapes and having a downward-facing recessed hole (1010), and the periphery is installed with upward-facing radially-arranged vertical blades, for being combined with a top cover (1000) configured by a heat conductive member and having its exterior formed in a round, conical or other geometric shapes, so as to jointly constitute a heat dissipation structure with airflow guide hole and having the annular arc-shape airflow guide hole (1030), the heat dissipation structure (1020) and the lamp housing (101) are integrally formed or individually manufactured then assembled as one piece, the bottom of the heat dissipation structure (1020) allows a LED or other lamps to be installed, the top cover (1000) provides functions of guiding airflow, dissipating heat or being fastened to the exterior;

Electric turbine axial fan (200): constituted by a turbine driven by a built-in electric motor (202) and having radially-arranged exhaust blades (207), the bottom of the static part of electric motor is installed on the top portion (104) of heat dissipation structure (1020) and spaced by a heat insulation member (204), a rotation shaft (206) of the rotary part of electric motor is upwardly extended for serving as a core shaft for driving the turbine having the radially-arranged exhaust blades (207), so as to introduce the external airflow to pass through an axial fluid inlet port (208) of the annular arc-shape airflow guide hole (1030) of the heat dissipation structure (1020), then be exhausted to the surroundings through the radially-arranged exhaust blades (207), the top of electric turbine axial fan (200) is provided with a sealed top cover (209) for providing protection to the electric motor (202);

FIG. 5 is a schematic structural view showing a first example wherein a heat dissipation structure (1020) being installed, and a recessed hole (1010) having a notch (1040) at top center and an annular arc-shaped airflow guide hole (1030) being provided for guiding the cold/hot airflow, according to the present invention, and FIG. 6 is a cross sectional view of FIG. 5 taken along a B-B line, which mainly consists of:

Lamp housing (101), heat dissipation structure (1020): the lamp housing (101) is constituted by a bowl-shaped structure reversely disposed, and configured by a heat conductive member or non-heat conductive member, the heat dissipation structure (1020) is configured by a high-performance heat conductive member, the top center thereof is formed in round or conical shape or other geometric shapes and having a downward-facing recessed hole (1010) with its periphery formed with a notch (1040), the periphery is installed with upward-facing radially-arranged vertical blades, for being combined with a top cover (1000) configured by a heat conductive member and having its exterior formed in a round, conical or other geometric shapes, so as to jointly constitute a heat dissipation structure with airflow guide hole and having the annular arc-shape airflow guide hole (1030), the heat dissipation structure (1020) and the lamp housing (101) are integrally formed or individually manufactured then assembled as one piece, and the bottom of the heat dissipation structure (1020) allows a LED or other lamps to be installed, and the top cover (1000) provides functions of guiding airflow, dissipating heat or being fastened to the exterior;

Electric turbine axial fan (200): constituted by a turbine driven by a built-in electric motor (202) and having radially-arranged exhaust blades (207), the bottom of the static part of electric motor is installed on the top portion (104) of heat dissipation structure (1020) and spaced by a heat insulation member (204), a rotation shaft (206) of the rotary part of electric motor is upwardly extended for serving as a core shaft for driving the turbine having the radially-arranged exhaust blades (207), so as to introduce the external airflow to pass through the axial fluid inlet port (208) of the annular arc-shaped airflow guide hole (1030) of the heat dissipation structure (1020), then be exhausted to the surroundings through the radially-arranged exhaust blades (207), and the top of electric turbine axial fan (200) is provided with a sealed top cover (209) for providing protection to the electric motor (202);

FIG. 7 is a schematic structural view showing the heat dissipation structure (1020) being installed, and the annular arc-shaped airflow guide hole (1030) and a columnar body (1050) having inward-recessed top center being provided for guiding the cold/hot airflow, and FIG. 8 is a cross sectional view of FIG. 7 taken along a C-C line, which mainly consists of:

Lamp housing (101), heat dissipation structure (1020): the lamp housing (101) is constituted by a bowl-shaped structure reversely disposed, and configured by a heat conductive member or non-heat conductive member, the heat dissipation structure (1020) is configured by a high-performance heat conductive member, the top center thereof is formed in round or conical shape or other geometric shapes and having an inward-recessed columnar body (1050), the periphery is installed with upward-facing radially-arranged vertical blades, for being combined with a top cover (1000) configured by a heat conductive member and having its exterior formed in a round, conical or other geometric shapes, so as to jointly constitute a heat dissipation structure with airflow guide hole and having the annular arc-shape airflow guide hole (1030), the heat dissipation structure (1020) and the lamp housing (101) are integrally formed or individually manufactured then assembled as one piece, and the bottom of the heat dissipation structure (1020) allows a LED or other lamps to be installed, the top cover (1000) provides functions of guiding airflow, dissipating heat or being fastened to the exterior;

Electric turbine axial fan (200): constituted by a turbine driven by a built-in electric motor (202) and having radially-arranged exhaust blades (207), the bottom of the static part of electric motor is installed on the top portion (104) of heat dissipation structure (1020) and spaced by a heat insulation member (204), a rotation shaft (206) of the rotary part of electric motor is upwardly extended for serving as a core shaft for driving the turbine having the radially-arranged exhaust blades (207), so as to introduce the external airflow to pass through the axial fluid inlet port (208) of the annular arc-shaped airflow guide hole (1030) of the heat dissipation structure (1020), then be exhausted to the surroundings through the radially-arranged exhaust blades (207), and the top of electric turbine axial fan (200) is provided with a sealed top cover (209) for providing protection to the electric motor (202);

The heat dissipating lamp device having electric axial turbine fan, disclosed from FIG. 1 to FIG. 8, can be further installed with an electric-driven light emitting lamp set (304) at the bottom of the heat dissipation structure (102) or the heat dissipation structure (1020), wherein:

Electric-driven light emitting lamp set (304): constituted by one or more than one of the following electric-driven light emitting lamps, including:

1) DC light emitting diode;
2) AC light emitted diode;
3) Gaseous lamp set;
4) Fluorescent lamp;
5) Lamp bulb;

The heat dissipating lamp device having electric axial turbine fan, disclosed from FIG. 1 to FIG. 8, can be further installed with a secondary optical device (303) in the lamp housing (101), wherein:

Secondary optical device (303): constituted by a structural body having light reflection function, and annularly installed at the top periphery of a light emitting lamp set (304), thereby equipped with functional operations of reflecting, refracting and condensing or diffusing the optical energy of the electric-driven light emitting lamp set (304);

The heat dissipating lamp device having electric axial turbine fan, disclosed from FIG. 1 to FIG. 8, can be further installed with a light-pervious lampshade (302) on the lamp housing (101), wherein:

Light-pervious lampshade (302): constituted by a fixed structure and light-pervious glass for being combined at the lower end of the lamp housing (101) for protecting the electric-driven light emitting lamp set (304) without influencing the illumination performance thereof;

The heat dissipating lamp device having electric axial turbine fan, disclosed from FIG. 1 to FIG. 8, can be further installed with a top portion covering net (301) at the outer periphery of the electric turbine axial fan (200), wherein:

Top portion covering net (301): constituted by a net-shaped structure for covering and protecting the electric turbine axial fan (200) and secured on the lamp housing (101);

The heat dissipating lamp device having electric axial turbine fan, disclosed from FIG. 1 to FIG. 8, can be further installed with a temperature switch (305) on the heat dissipation structure (102) or the heat dissipation structure (1020), wherein:

Temperature switch (305): constituted by an electromechanical joint switch configured by electrical mechanic or dual metal sheets or memory alloy, or constituted by a solid-state switch device driven by thermistor or thermocouple, wherein one or more than one temperature switches (305) are installed at locations close to the location where the electric-driven light emitting lamp set (304) being installed on the heat dissipation structure (102) or the heat dissipation structure (1020), so when the temperature generated by the electric-driven light emitting lamp set (304) transmitted to the temperature switch (305) installed on the heat dissipation structure (102) or the heat dissipation structure (1020) exceeds a preset temperature value, all or part of the controlled power source of the electric-driven light emitting lamp set (304) is cut off for preventing the electric-driven light emitting lamp set (304) from overheating.

Figure 9:
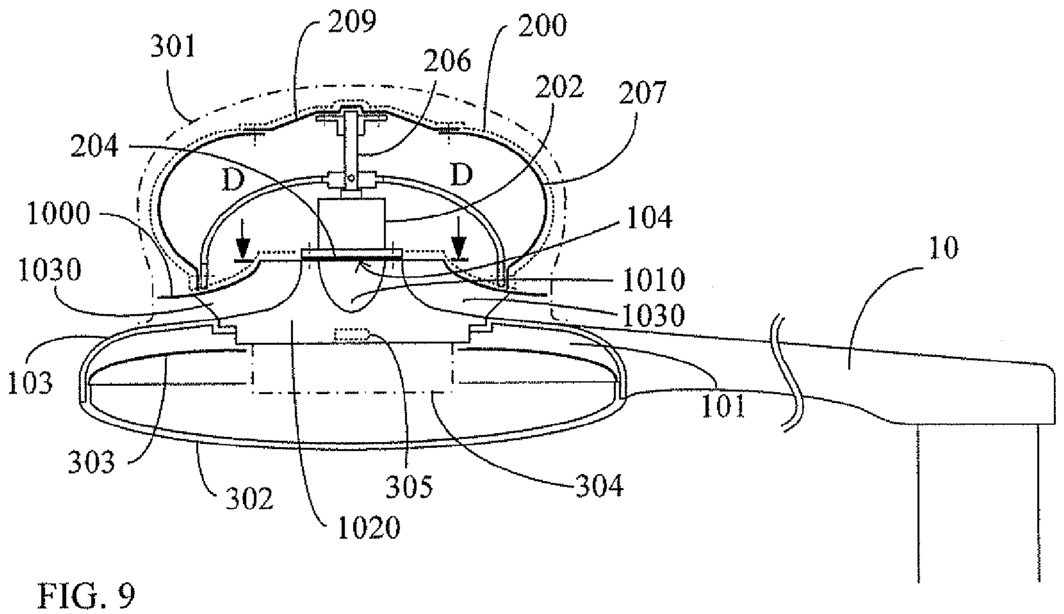
FIG. 9 is a schematic structural view showing the lamp housing (101) being combined with an external support arm (10), according to one embodiment of the present invention.
Figure 10:
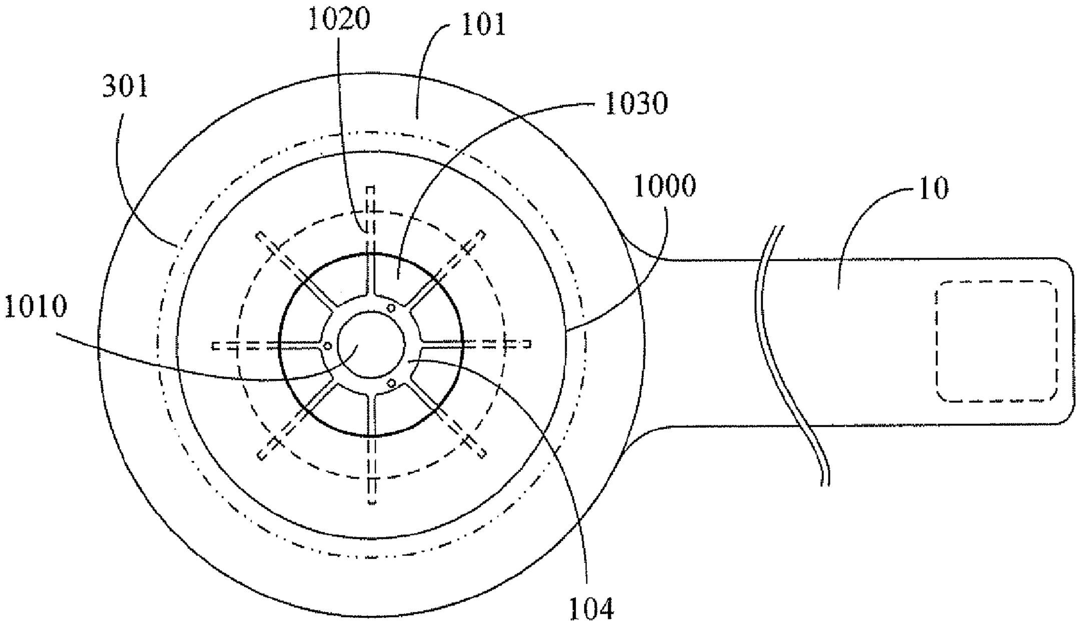
FIG. 10 is a cross sectional view of FIG. 9 taken along a D-D line.

In the heat dissipating lamp device having electric axial turbine fan disclosed from FIG. 1 to FIG. 8, the lamp housing (101) is provided with a structure for being combined with an external support arm (10) for allowing the support arm (10) to be combined;

FIG. 9 is a schematic structural view showing the lamp housing (101) being combined with an external support arm (10), according to one embodiment of the present invention, FIG. 10 is a cross sectional view of FIG. 9 taken along a D-D line.

Figure 11:
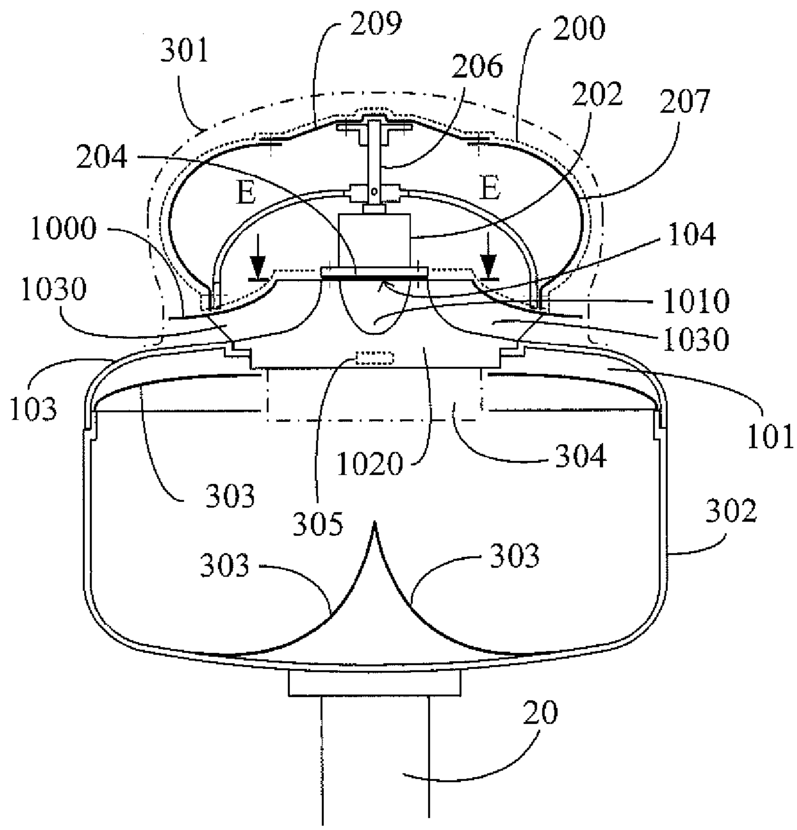
FIG. 11 is a schematic structural view showing the lamp housing (101) being combined with an external support rod (20), according to one embodiment of the present invention.
Figure 12:
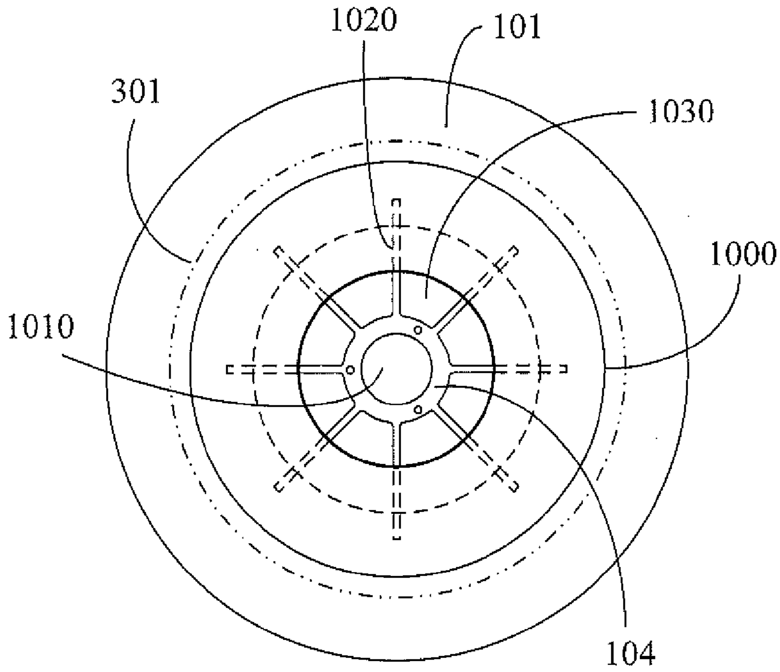
FIG. 12 is a cross sectional view of FIG. 11 taken along an E-E line.

In the heat dissipating lamp device having electric axial turbine fan disclosed from FIG. 1 to FIG. 8, the lamp housing (101) is provided with a structure for being combined with an external support rod (20) for allowing the support rod (20) to be combined;

FIG. 11 is a schematic structural view showing the lamp housing (101) being combined with an external support rod (20), according to one embodiment of the present invention, FIG. 12 is a cross sectional view of FIG. 11 taken along an E-E line.

Figure 13:
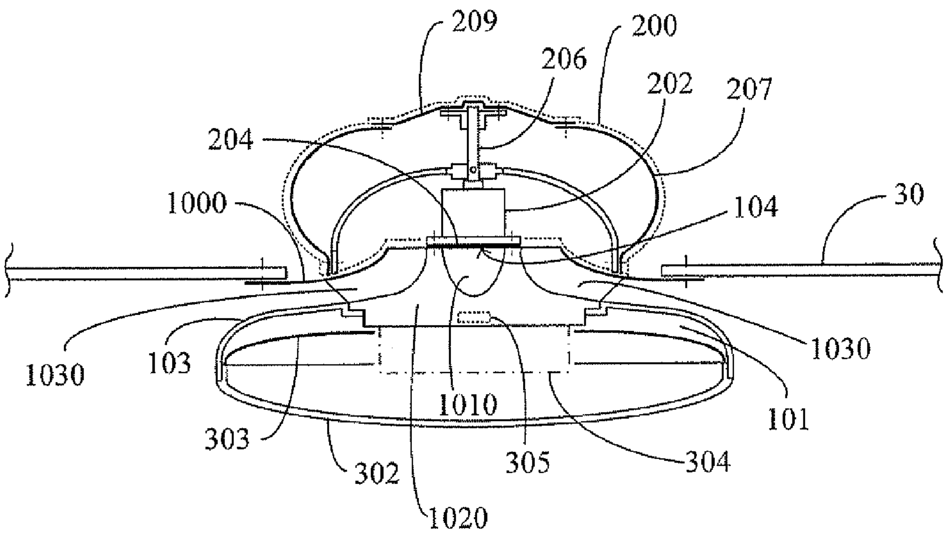
FIG. 13 is a schematic structural view showing the lamp housing (101) being combined with an external partition structure (30), according to one embodiment of the present invention.

In the heat dissipating lamp device having electric axial turbine fan disclosed from FIG. 1 to FIG. 8, the top cover (1000) is provided with a partition structure (30) to be combined between the airflow passing the heat dissipation structure (102) or the heat dissipation structure (1020), and the airflow exhausted from the electric turbine axial fan (200);

FIG. 13 is a schematic structural view showing the lamp housing (101) being combined with an external partition structure (30), according to one embodiment of the present invention.

Figure 14:
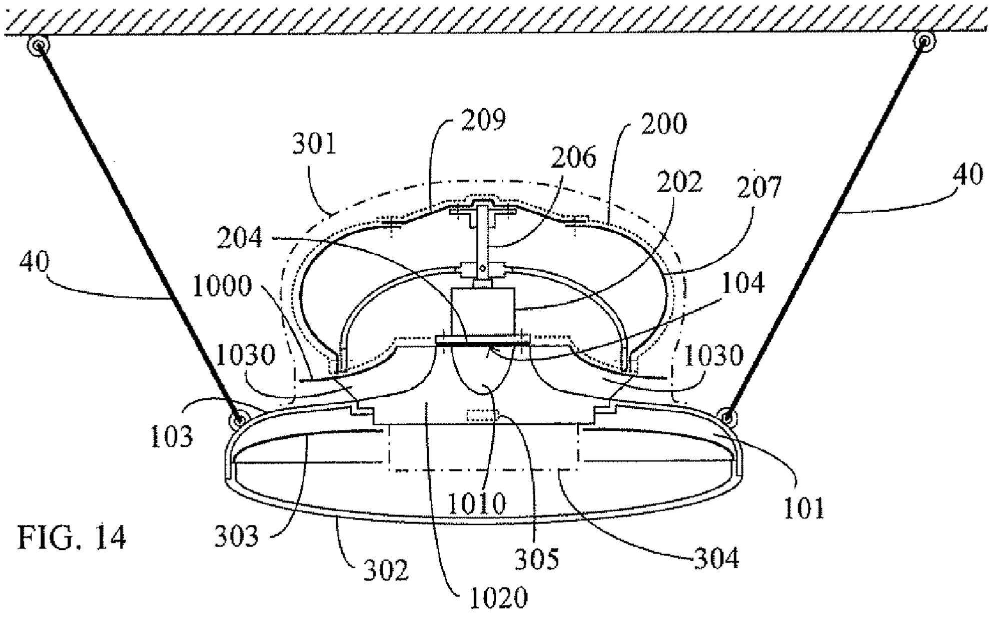
FIG. 14 is a schematic structural view illustrating being combined with a suspension device (40), according to one embodiment of the present invention.

The heat dissipating lamp device having electric axial turbine fan, disclosed from FIG. 1 to FIG. 8, can be combined with a suspension device (40) for providing a suspension installation; wherein the suspended location combined with the suspension device (40) includes the annular arc-shape airflow guide surface (103), the top cover (1000) or the structural body of heat dissipating lamp device;

FIG. 14 is a schematic structural view illustrating being combined with a suspension device (40), according to one embodiment of the present invention.

The invention claimed is:

1. A heat dissipating lamp device, comprising:

a lamp housing (101);

a heat dissipation structure (102 or 1020);

an electric turbine axial fan (200) driven by an electric motor (202) and installed on a top portion of the heat dissipation lamp housing (101), so that when the electric turbine axial fan (200) is operated, airflow is concentrated from an outside of the top portion of the lamp housing (101), which is relatively hotter, towards a center of the lamp housing (101), and guided to upwardly enter an axial airflow inlet port (208) formed at a bottom of the electric turbine axial fan (200), thereby being exhausted to surroundings of the lamp device through radially-arranged exhaust blades (207), wherein:

the lamp housing (101) is constituted by a bowl-shaped structure reversely disposed, and configured by a heat conductive member or non-heat conductive member, a top center of the lamp housing (101) and the heat dissipation structure (102 or 1020) being formed in a round shape or conical shape and having vertical radial blades integrally formed or assembled with each other, a bottom of the heat dissipation structure (102 or 1020) allows a lamp to be installed, and the lamp housing (101) being formed with an annular arc-shape airflow guide surface (103) along a periphery of the heat dissipation structure (102 or 1020); and electric turbine axial fan (200) is constituted by a turbine driven by a built-in electric motor (202) and having radially-arranged exhaust blades (207), a bottom of a static part of electric motor being installed on a top portion (104) of the heat dissipation structure (102 or 1020) and spaced by a heat insulation member (204), a rotation shaft (206) of a rotary part of electric motor being upwardly extended for serving as a core shaft for driving the turbine having the radially-arranged exhaust blades (207), the bottom of the electric turbine axial fan (200) being formed with the axial fluid inlet port (208) for enabling the fluid passing the annular arc-shaped airflow guide surface (103) of the lamp housing (101) to pass through the periphery of the top of the heat dissipation structure (102 or 1020) and then be exhausted to the surroundings through the radially-arranged exhaust blades (207), and the top of electric turbine axial fan (200) being provided with a sealed top cover (209) for providing protection to the electric motor (202).

2. A heat dissipating lamp device having an electric turbine axial fan (200) as claimed in claim 1, wherein the heat dissipation structure (1020) is further installed with an annular arc-shaped airflow guide hole (1030) for guiding the airflow, the heat dissipation structure (1020) is configured by a high-performance heat conductive member having a downward-facing recessed hole (1010) and the periphery is installed with upward-facing radially-arranged vertical blades for being combined with the top cover (1000), the top cover (1000) being configured by a heat conductive member and having its exterior formed in a round, conical, or other geometric shape so as to jointly constitute a heat dissipation structure having the annular arc-shape airflow guide hole (1030), the heat dissipation structure (1020) and the lamp housing (101) being integrally formed or individually manufactured then assembled as one piece, and the top cover (1000) providing functions of guiding the airflow, dissipating heat or being fastened to an exterior of the heat dissipating lamp device.

3. A heat dissipating lamp device having an electric turbine axial fan as claimed in claim 1, wherein the heat dissipation structure (1020) is configured by a high-performance heat conductive member, the top center thereof being formed in round, conical or other geometric shapes and having a downward-facing recessed hole (1010) with its periphery formed with a notch (1040), the periphery of the heat dissipation structure (1020) being installed with upward-facing radially-arranged vertical blades for being combined with the top cover (1000) so as to jointly constitute a heat dissipation structure with the annular arc-shape airflow guide hole (1030), the heat dissipation structure (1020) and the lamp housing (101) being integrally formed or individually manufactured and then assembled as one piece, and the top cover (1000) providing functions of guiding airflow, dissipating heat or being fastened to an exterior of the heat dissipating lamp device.

4. A heat dissipating lamp device having electric turbine axial fan as claimed in claim 1, wherein the heat dissipation structure (1020) is configured by a high-performance heat conductive member, the top center thereof being formed in round, conical shape or other geometric shapes and having an inward-recessed columnar body (1050), the periphery of the heat dissipation structure (1020) being installed with upward-facing radially-arranged vertical blades for being combined with the top cover (1000) so as to jointly constitute a heat dissipation structure with the annular arc-shape airflow guide hole (1030), the heat dissipation structure (1020) and the lamp housing (101) being integrally formed or individually manufactured and then assembled as one piece, and the top cover (1000) providing functions of guiding airflow, dissipating heat or being fastened to an exterior of the heat dissipating lamp device.

5. A heat dissipating lamp device having an electric turbine axial fan as claimed in any one of claims 1~4, wherein the lamp is an electric-driven light emitting lamp set (304) at the bottom of the heat dissipation structure (102 or 1020), wherein the electric-driven light emitting lamp set (304) is constituted by one or more than one of the following electric-driven light emitting lamps, including:

1) a DC light emitting diode;
2) an AC light emitted diode;
3) a gaseous lamp set;
4) a fluorescent lamp;
5) a lamp bulb.

6. A heat dissipating lamp device having an electric turbine axial fan as claimed in any one of claims 1~4, further comprising a secondary optical device (303) in the lamp housing (101), wherein constituted by a structural body having a light reflection function and annularly installed at a top periphery of a light emitting lamp set (304) for reflecting, refracting and condensing or diffusing optical energy of the electric-driven light emitting lamp set (304).

7. A heat dissipating lamp device having an electric turbine axial fan as claimed in any one of claims 1~4, further comprising a light-pervious lampshade (302) on the lamp housing (101), wherein the light-pervious lampshade (302) being constituted by a fixed structure and light-pervious glass combined at a lower end of the lamp housing (101) for protecting an electric-driven light emitting lamp set (304) without influencing illumination performance thereof.

8. A heat dissipating lamp device having an electric turbine axial fan as claimed in any one of claims 1~4, further installed with a top portion covering net (301) secured on the lamp housing (101) at an outer periphery of the electric turbine axial fan (200) for covering and protecting the electric turbine axial fan (200).

9. A heat dissipating lamp device having an electric turbine axial fan as claimed in any one of claims 1~4, further comprising at least one temperature switch (305) on the heat dissipation structure (102 or 1020) and installed at a location close to where an electric-driven light emitting lamp set (304) is installed on the heat dissipation structure (102 or 1020) so when a temperature generated by the electric-driven light emitting lamp set (304) exceeds a preset temperature value, all or part of a controlled power source of the electric-driven light emitting lamp set (304) is cut off for preventing the electric-driven light emitting lamp set (304) from overheating.

10. A heat dissipating lamp device having an electric turbine axial fan as claimed in any one of claims 1~4, further comprising one or more than one the following fastening means:

1) fastening means for combining the lamp housing (101) with an external support arm (10);
2) fastening means for combining the lamp housing (101) with an external support rod (20);
3) fastening means for providing the top cover (1000) with a partition structure (30) situated between an airflow passing the heat dissipation structure (102 or 1020) and an airflow exhausted from the electric turbine axial fan (200);
4) fastening means for fastening a suspension device (40) for suspending the heat dissipating lamp device, the suspension device (40) being fastened to one of the annular arc-shape airflow guide surface (103), the top cover (1000), and a structural body of heat dissipating lamp device.

11. A heat dissipating lamp device having an electric turbine axial fan as claimed in claim 1, wherein the lamp device includes a high power LED lamp set.

12. A heat dissipating lamp device having an electric turbine axial fan as claimed in claim 1, wherein when external wind power drives the turbine axial fan, loading of electric motor is lowered so as to reduce the electric power outputted by the electric motor.

* * * * *